United States Patent [19]
Weed

[11] 4,178,126
[45] Dec. 11, 1979

[54] WIND DRIVEN POWER GENERATOR

[75] Inventor: Gehres D. Weed, Edmonton, Canada

[73] Assignee: Altarctic Engineering & Construction Ltd., Edmonton, Canada; a part interest

[21] Appl. No.: 831,347

[22] Filed: Sep. 7, 1977

[51] Int. Cl.² ............................................... F03D 7/06
[52] U.S. Cl. ................................... 416/17; 416/118; 416/119
[58] Field of Search ...................... 416/17, 121 A, 111, 416/118, 119

[56] References Cited

U.S. PATENT DOCUMENTS

| | | | |
|---|---|---|---|
| 1,075,060 | 10/1913 | O'Toole | 416/17 |
| 1,201,184 | 10/1916 | Holben | 416/17 |
| 1,408,988 | 3/1922 | Chenoweth | 416/17 |
| 1,416,052 | 5/1922 | Nolan | 416/17 |
| 3,902,072 | 8/1975 | Quinn | 416/111X |

FOREIGN PATENT DOCUMENTS

| | | | |
|---|---|---|---|
| 650805 | 2/1929 | France | 416/9 |
| 915892 | 11/1946 | France | 416/111 |
| 2289764 | 5/1976 | France | 416/119 |
| 2289769 | 5/1976 | France | 416/119 |
| 2291379 | 6/1976 | France | 416/119 |
| 2307145 | 11/1976 | France | 416/17 |

*Primary Examiner*—Everette A. Powell, Jr.
*Attorney, Agent, or Firm*—Clarence A. O'Brien; Harvey B. Jacobson

[57] ABSTRACT

A journaled rotor is provided for rotation about an axis to be disposed transverse to a fluid flow path and the rotor includes a plurality of mounting portions spaced radially outwardly from and circumferentially about the axis having a plurality of vane assemblies rotatably mounted therefrom for angular displacement about axis generally paralleling the axis of rotation of the rotor. Vane assembly displacement control structure is operatively connected to the vane assemblies for angularly displacing the vane assemblies relative to the corresponding mounting portions 180 degrees each 360 degrees of angular displacement of the rotor and in directions opposite the direction of angular displacement of the rotor upon rotation of the latter. The vane assemblies are variously optimumly angularly positioned relative to the corresponding mounting portions and each other to effect substantially maximum thrust therefrom on the rotor as a result of fluid flow thereagainst from one side of the axis of rotation of the rotor. The vane assembly displacement control structure includes an adjustment feature operative to effect simultaneous adjusted angular displacement of the vane assemblies relative to the corresponding mounting portions independent of rotation of the rotor and the adjustment feature includes fluid flow direction sensing structure operative to sense changes in the direction of fluid flow toward the axis of rotation of the rotor and to accordingly variously angularly position the vane assemblies about their axes of rotation relative to the mounting portions in order to maintain the optimumly angularly displaced positions thereof relative to the changed fluid flow direction. One disclosed form of the invention includes a control for the adjustment feature whereby the vane assemblies may be manually variously angularly positioned relative to the corresponding mounting portions of the rotor toward positions displaced relative to the direction of fluid flow against the rotor whereby the vane assemblies will be inoperative to drive the rotor. Further, a second form of the invention includes structure whereby the vane assemblies each comprise a plurality of vanes which may be remotely feathered toward positions parallel to the fluid flow acting upon the rotor.

5 Claims, 11 Drawing Figures

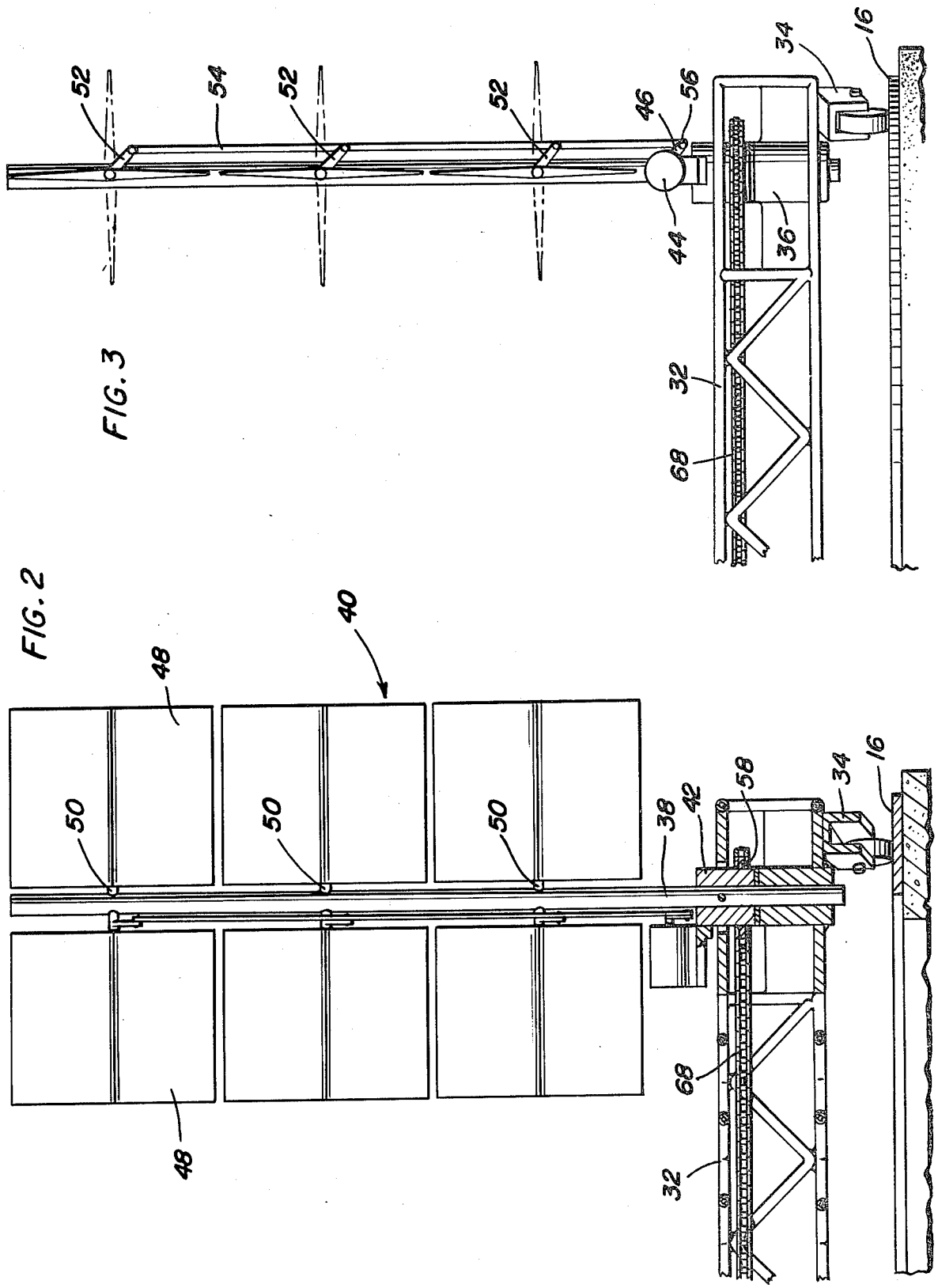

to generator

WIND DRIVEN POWER GENERATOR

BACKGROUND OF THE INVENTION

Various forms of fluid driven motors and fluid driving motors including rotors equipped with constantly varying pitch vanes have been heretofore provided and include some of the general structural and operational features of the instant invention. However, these previously known devices have not been particularly well adapted to harness wind power and to compensate for changes in the wind direction. Accordingly, a need exists for a vaned wind driven power generator which will be capable of generating considerable amounts of power and which will readily compensate for changes in wind direction.

BRIEF DESCRIPTION OF THE INVENTION

The rotary power generator of the instant invention comprises a rotor to be journaled about a vertical axis and to be mounted in position for reaction as a result of horizontal wind currents thereon. The power generator includes circumferentially spaced vane assemblies rotatably supported from the rotor and interconnected for angular displacement 180 degrees each 360 degrees of angular displacement of the rotor and in directions opposite to the direction of angular displacement of the rotor. The vane assemblies are mounted for rotation relative to the rotor about axis generally paralleling the axis of rotation of the rotor and the rotary power generator includes rotatable wind vane structure for sensing changes in the direction of the wind and for variously angularly displacing the vane assemblies relative to the rotor independent of rotation of the latter toward optimum positions of the vane assemblies whereby maximum thrust thereon is developed by the wind even though the direction of wind on the rotor may change. In addition, the power generator includes structure whereby the vane portions of the vane assemblies may be angularly displaced relative to the rotor in order to render wind acting upon the vane portions ineffective to drive the rotor.

The main object of this invention is to provide a rotary power generator capable of developing large amounts of power from relatively light wind forces.

Another object of this invention is to provide a wind driven rotary power generator including structure which will automatically compensate for changes in the direction of the wind incident thereon.

A still further object of this invention is to provide a vane equipped wind driven rotary power generator constructed in a manner whereby the vane portions thereof may be displaced toward feathered positions in which wind incident thereon will be ineffective to drive the generator.

Another very important object of this invention is to provide a wind driven power generator of a basic design enabling the generator to be manufactured in considerably varying size in order to be adapted to generate greatly varied amounts of power.

A final object of this invention to be specifically enumerated herein is to provide a rotary wind driven power generator in accordance with the preceding objects and which will conform to conventional forms of manufacture, be of simple construction and dependable in operation so as to provide a device which will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged fragmentary vertical sectional view taken substantially upon the plane indicated by the section line 2—2 of FIG. 1;

FIG. 3 is a side elevational view of one of the elongated arm portions of the rotor portion of the generator and with alternate full feathered positions of the vane portions thereof illustrated in phantom lines;

DETAILED DESCRIPTION OF THE INVENTION

Figure 1:
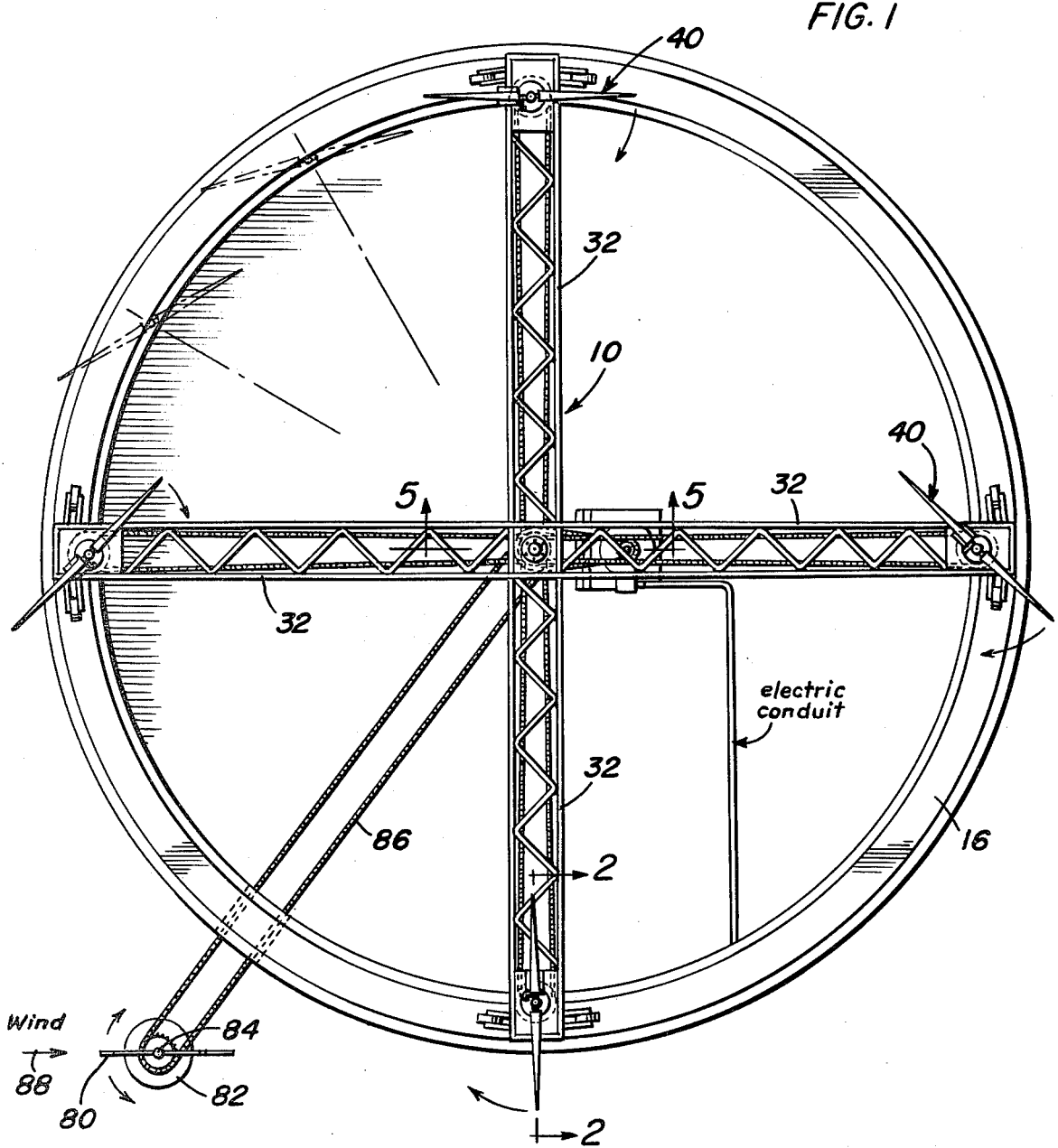
FIG. 1 is a top plan view of a first form of wind driven power generator constructed in accordance with the present invention.

Referring now more specifically to the drawings the numeral 10 generally designates the wind driven power generator of the instant invention. The generator 10 includes a ground supported base 12 including a mount 14 supported from the central portion of the base 12. In addition, a ground supported circular track assembly 16 encircles the base 12.

An upstanding inner support shaft 18 is journaled from the mount 14 and has a lower sprocket wheel 20 mounted thereon. An outer tubular shaft 22 is journaled from the shaft 18 by means of suitable bearings 24 and 26 and a thrust bearing assembly 28 is interposed between the sprocket wheel 20 and the mount 14 about the shaft 18 for supporting the vertical loading of the shafts 18 and 22.

The shaft 22 comprises the hub of a rotor assembly referred to in general by the reference numeral 30 and the rotor assembly includes a plurality of radially outwardly projecting support arms 32 whose outer ends include wheeled truck assemblies 34 rollingly engaged with the track assembly 16. In addition, the outer end of each support arm 32 includes a stationary mount 36 from which an upstanding shaft 38 is journaled and each shaft 38 comprises a part of a vane assembly referred to in general by the reference numeral 40.

The lower end of each shaft 38 includes a mount 42 supported therefrom and a reversible electrically operated gear motor 44 is supported from each mount 42 and includes an oscillatable crank arm 46.

Each of the vane assemblies 40 includes a plurality of pairs of vanes 48 spaced therealong and supported from opposite ends of shafts 50 oscillatably supported from the shaft 38 and including crank arms 52 whose free ends are pivotally connected to longitudinally spaced portions of an operating shaft 54 having one end thereof pivotally attached as at 56 to the free end of the associated crank arm 46. In addition, each of the mounts 42 has a sprocket wheel 58 mounted thereon.

The upper portions of the arms 32 are attached at their inner ends to an upper hub 60 journaled on the upper end of the shaft 18 by means of a bearing 62 and four sprocket wheels 64 are removably splined to the splined portion 66 of the shaft 18 intermediate the bearing 62 and the bearing 24. Four endless chains 68 are entrained about the sprocket wheels 64 and also the sprocket wheels 58 carried by the mounts 52 supported from the shafts 38, the sprocket wheels 58 being twice as great in circumference as the sprocket wheels 64. Also, it will be noted that the outer shaft 22 has a sprocket wheel 70 mounted thereon and that a generator 72 is supported from the base 12 and includes a rotary input shaft 74 having a sprocket wheel 76 mounted thereon aligned with the sprocket wheel 70, an endless chain 78 being trained about the sprocket wheels 70 and 76 in order that the rotor assembly 30 may drive the generator 72.

With attention now invited more specifically to FIG. 1, it may be seen that a wind vane 80 is rotatably supported from a ground anchored base 82 for oscillation about an upstanding axis and that the wind vane 80 includes a sprocket wheel 84. An endless chain 86 is trained about sprocket wheels 20 and 84 whereby changes in the direction of the wind sensed by the wind vane 80 will effect rotation of the shaft 18 and thus the angular positioning of the vane assemblies 40 relative to the corresponding support arms 32 independent of rotation of the rotor assembly 30.

In operation, with the wind incident upon the rotor assembly 30 in the direction indicated by the arrow 88 in FIG. 1, the vane assemblies 40 are angularly displaced relative to the corresponding support arms such that the vane assembly in the 6 o'clock position illustrated in FIG. 1 is disposed normal to the wind direction 88 and the vane assembly 40 in the 12 o'clock position of FIG. 1 is disposed in a full feathered position relative to the direction of the wind. In addition, the 9 and 3 o'clock positioned vane assemblies 40 are oppositely inclined relative to the direction of the wind in order that the wind incident thereon will effect counterclockwise rotation of the rotor assembly 30 as illustrated in FIG. 1. Of course, as the rotor assembly rotates one full revolution in a counterclockwise direction, each of the vane assemblies 40 will rotate 180 degrees in a clockwise direction in order that each vane assembly, according to its angular positioning due to rotation of the rotor assembly 30 relative to the direction of the wind will maintain optimum position to effect driving of the rotor assembly 30 in a counterclockwise direction. As the wind direction changes, the wind vane 80 swings with the wind and thereby automatically angularly displaces the vane assemblies 40 relative to the corresponding support arms independent of rotation of the rotor assembly 30 in order to maintain the angular positioning of the vane assemblies 40 optimum for driving the rotor assembly 30 in a counterclockwise direction.

Figure 4:
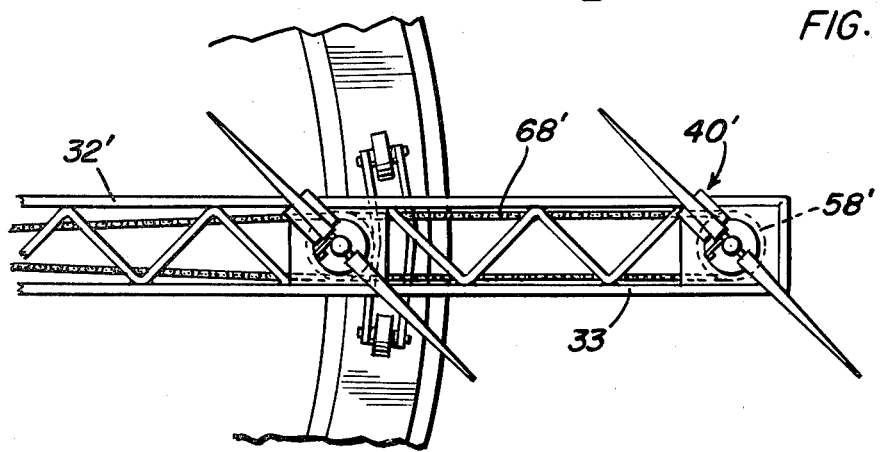
FIG. 4 is a fragmentary enlarged top plan view of a modified form of support arm which may be utilized in the construction of the power generator and including a pair of rotary vane assemblies.
Figure 5:
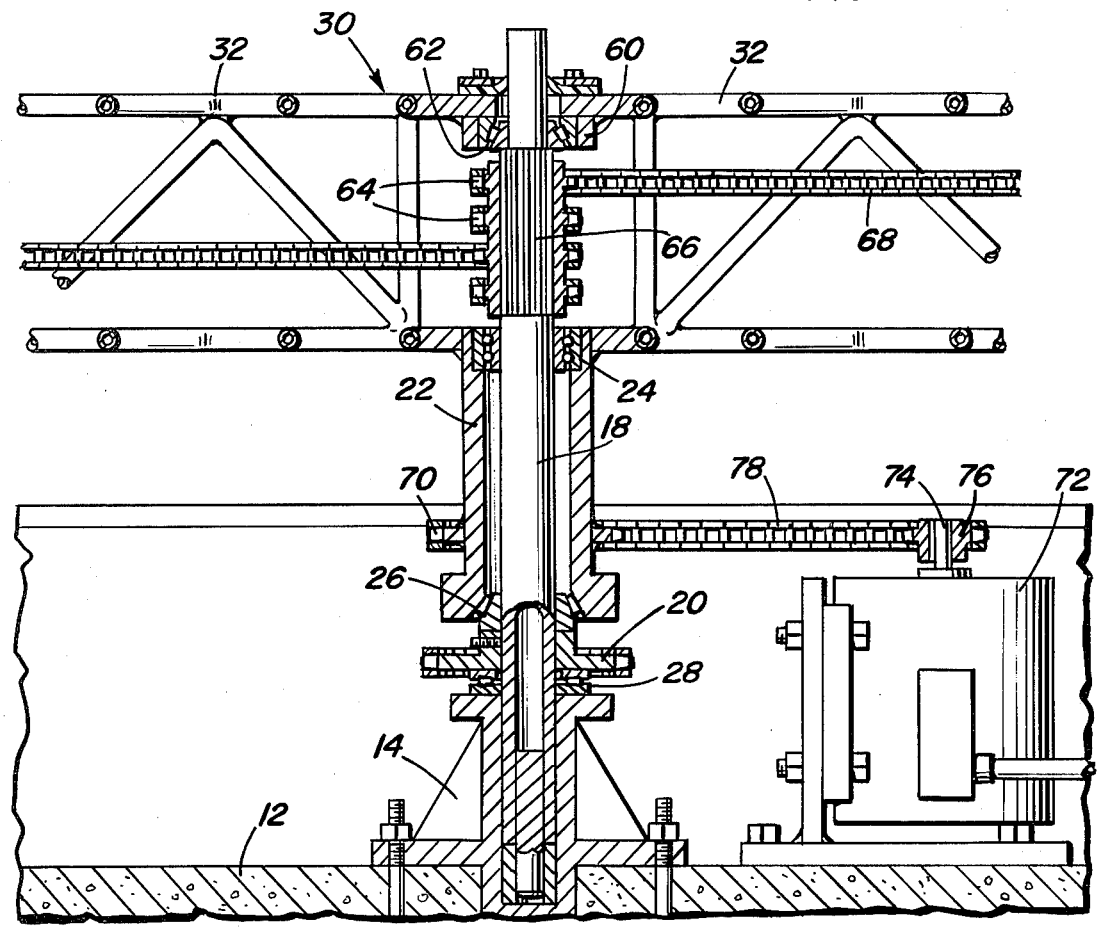
FIG. 5 is an enlarged fragmentary vertical sectional view taken substantially upon the plane indicated by the section line 5—5 of FIG. 1.
Figure 6:
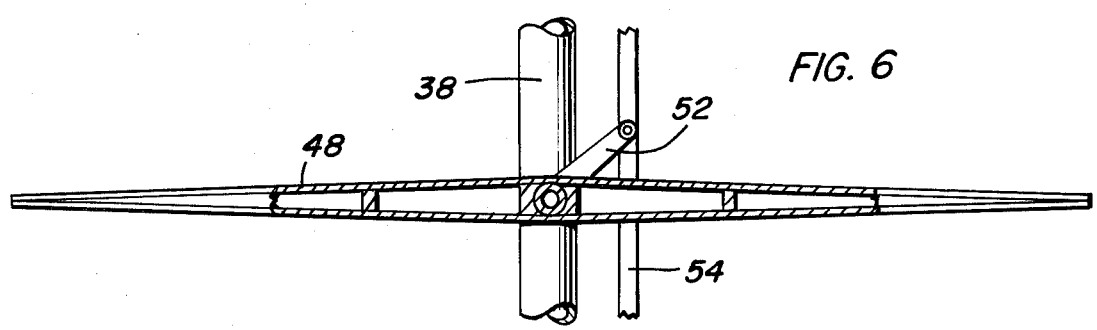
FIG. 6 is a fragmentary enlarged side elevational view of one of the vanes with the latter illustrated in full feathered position and with portions thereof being broken away and illustrated in vertical sections.
Figure 7:
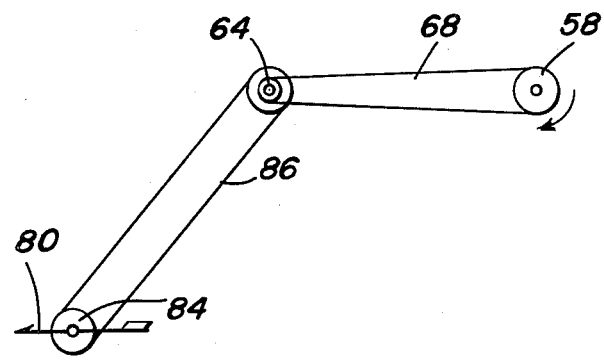
FIG. 7 is a plan schematic view illustrating the manner in which the wind vane for the power generator is operative to effect angular displacement of the vane assemblies independent of rotation of the rotor of the power generator in order to maintain the vane assemblies optimumly positioned relative to the incident wind.
Figure 8:
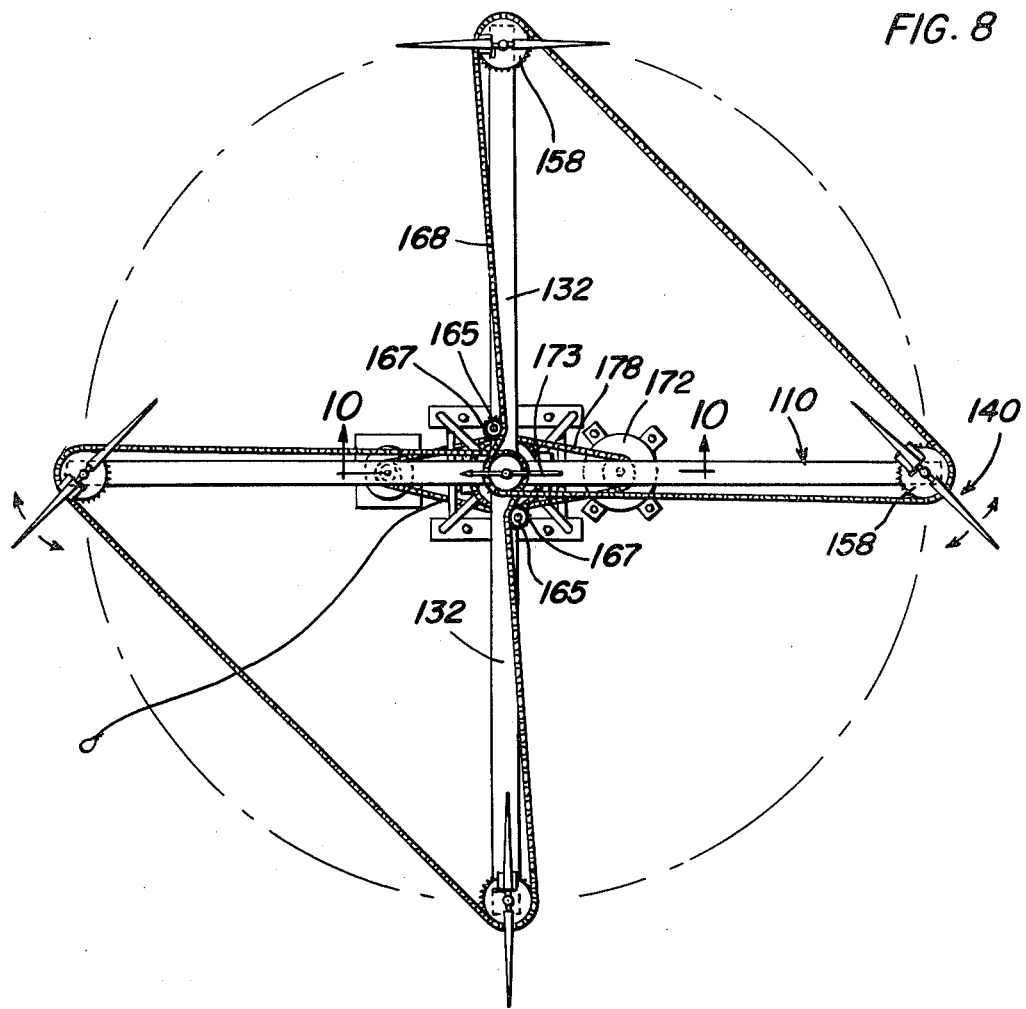
FIG. 8 is a top plan view of a modified form of power generator constructed in accordance with the present invention.
Figure 9:
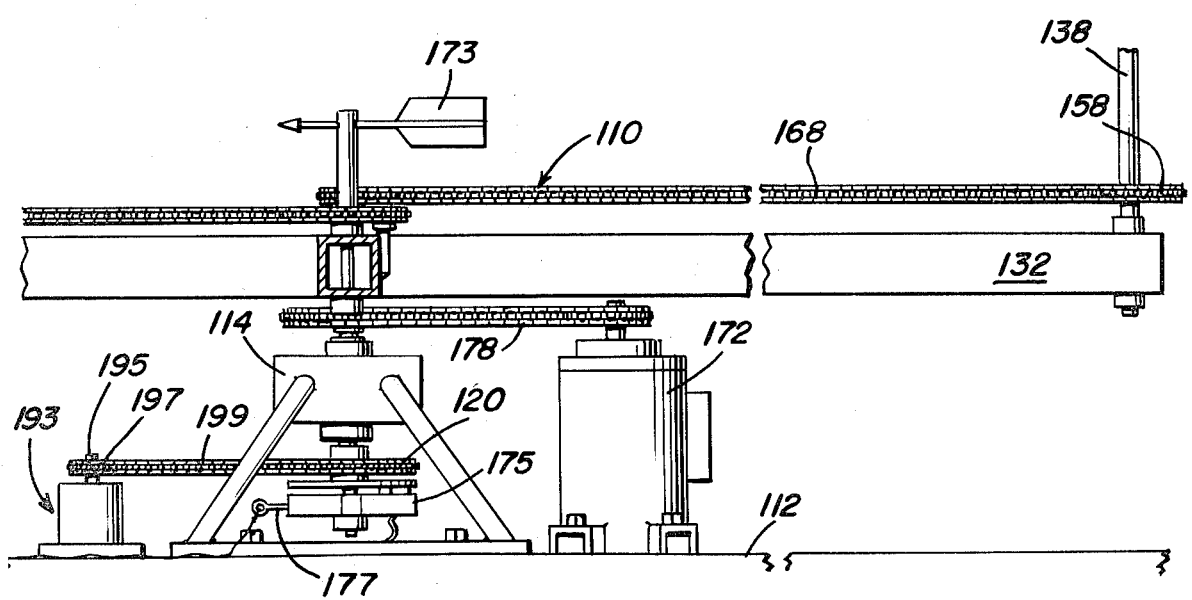
FIG. 9 is an enlarged fragmentary vertical sectional view illustrating the manner in which the vane assemblies of the power generator may be adjustably angularly displaced through the utilization of a reversible electric motor to compensate for changes in wind direction.
Figure 10:
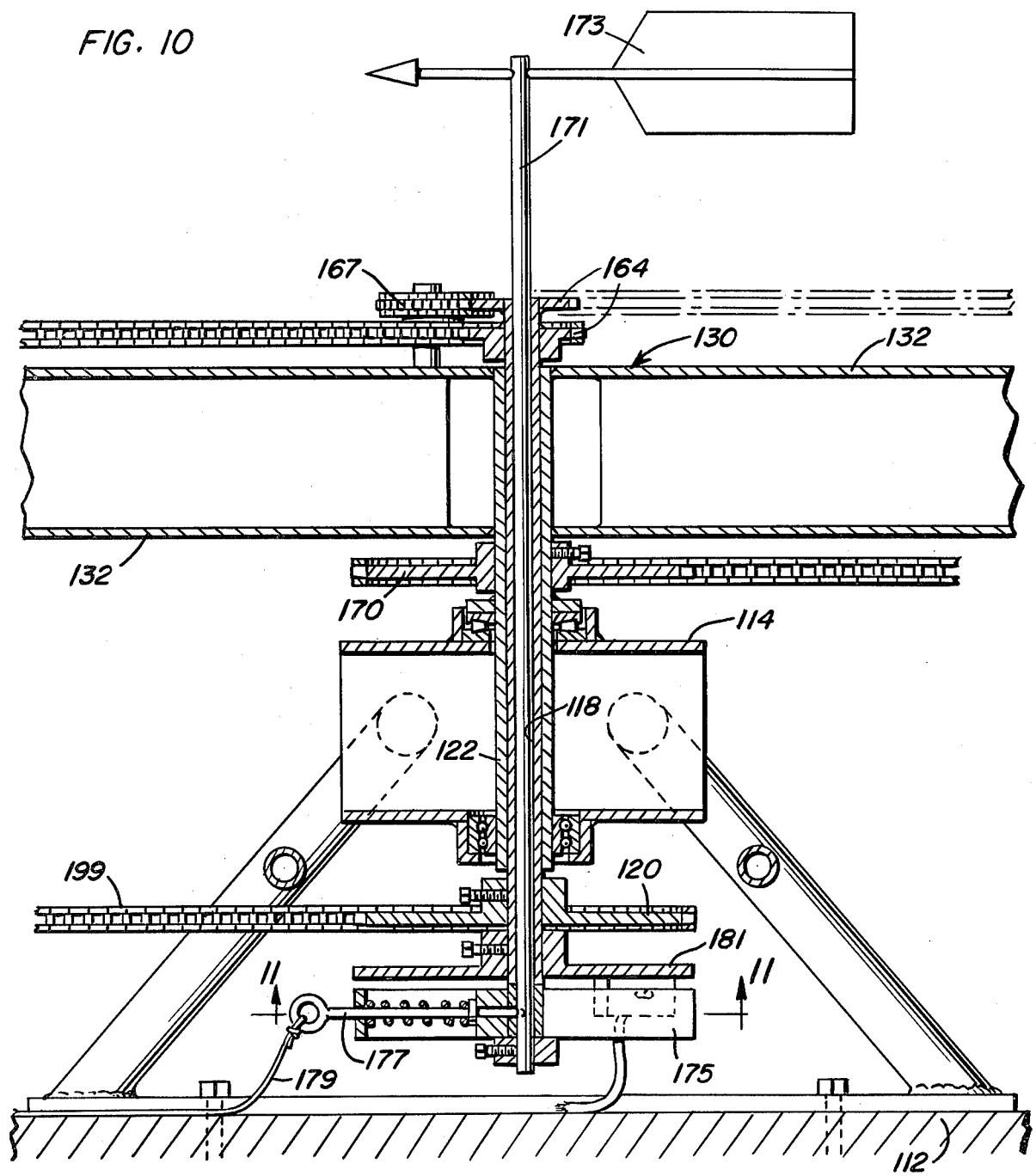
FIG. 10 is an enlarged fragmentary vertical sectional view taken substantially upon the plane indicated by the section line 10—10 of FIG. 8.
Figure 11:
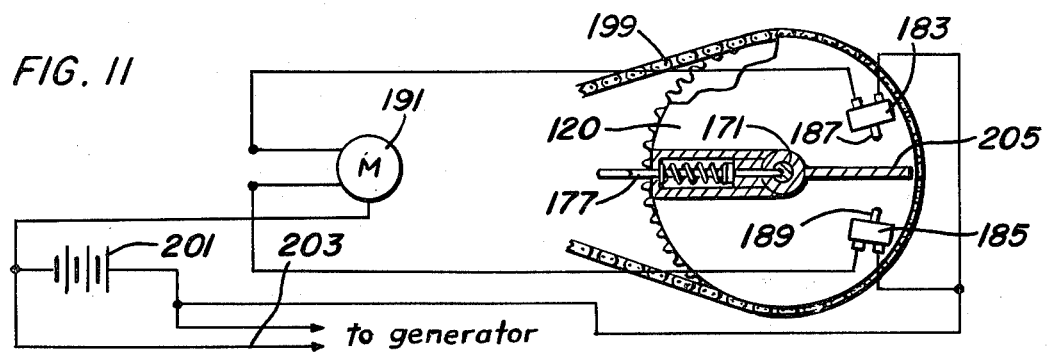
FIG. 11 is a schematic view illustrating the reversible electric motor control circuitry for adjustably angularly displacing the vane assemblies in response to change in wind direction.

With attention invited more specifically to FIG. 4 of the drawings, there may be seen a modified form of support arm 32' including an outwardly projecting lengthwise extension 33 from which a second vane assembly referred to in general by the reference number 40' is rotatably supported. Of course, each second vane assembly 40' includes a sprocket wheel 58' corresponding to the associated sprocket wheel 58 and about which an extended length chain 68' corresponding to the chain 68 is also trained.

With reference now more specifically to FIGS. 8-11 of the drawings, there may be seen a second form of wind driven power generator referred to in general by the reference numeral 110. The generator 110 includes a base 112 corresponding to the base 12 and a mount 114 corresponding to the mount 14. In addition, a pair of inner and outer tubular shafts 118 and 122 are journaled from the mount 114 corresponding to the shafts 18 and 22 and the shaft 118 has a sprocket wheel 120 mounted thereon corresponding to the sprocket wheel 20. Also, the power generator 10 includes a rotor assembly referred to in general by the numeral 130 including four radially outwardly projecting support arms 132 and which is supported from the shaft 122 for driving the latter, a sprocket wheel 170 being mounted on the shaft 122 corresponding to the sprocket wheel 70. The upper end of the shaft 122 has a pair of sprocket wheels 164 mounted thereon corresponding to the sprocket wheels 64 and diametrically opposite arms 132 of the rotor assembly 130 include fixed idle shafts 165 supported therefrom upon which additional idle sprocket wheels 167 are journaled. From FIG. 9 of the drawings it may be seen that the outer ends of the support arms 132 are provided with shafts 138 corresponding to the shafts 38 upon which sprocket wheels 158 corresponding to the sprocket wheels 58 are mounted and from FIG. 8 of the drawings it may be seen that a pair of endless chains 168 are each trained about one pair of the sprocket wheels 158 and a corresponding sprocket wheel 167 as well as one of the sprocket wheels 164. Accordingly, the vane assemblies 140 corresponding to the vane assemblies 40 are also interconnected relative to each other and to the shaft 118 corresponding to the shaft 18 for displacing the vane assemblies 140 180 degrees for each revolution of the rotor assembly 130 and in directions opposite to the direction of rotation of the rotor assembly 130.

A shaft 171 having a wind vane 173 mounted on its upper end is journaled through the shaft 118 and has a switch actuating blade structure 175 releasably keyed in predetermined angularly displaced position on the lower end thereof by means of a spring biased latch 177 having one end of a pull line 179 anchored thereto. Mounted on the shaft 118 below the sprocket wheel 120 and above the switch actuating blade structure 175 is a switch mount 181 supporting a pair of switches 183 and 185, including push type actuators 187 and 189, electrically connected to the motor 191 of a gear motor assembly referred to in general by the reference numeral 193 supported from the base 112. The switches 183 and 185, when alternately actuated, are operative to effect operation of the motor 191 in opposite directions. The gear motor assembly 193 includes a rotary output shaft 195 upon which a gear wheel 197 is mounted and an endless chain 199 is trained about the gear wheels 120 and 197. The motor 191 is electrically connected to a suitable source 201 of electrical potential through the switches 183 and 185 and the source 202 may comprise a battery which may be charged through a charging circuit 203 powered by the generator 172 corresponding to the generator 72 and driven from the sprocket wheel 170 by means of an endless chain 178 corresponding to the chain 78. The gear reduction of the gear motor assembly 193 is operative to maintain the shaft 118 stationary when the motor 191 is inoperative and the blade portion 205 of the switch actuating blade structure 175 may swing with the wind vane 173 in order to push the switch actuators 187 and 189 to effect reversing operation of the motor 191 in response to oscillation of the wind vane 173. Of course, if the wind vane 173 swings responsive to a change in wind direction, the switch actuating blade assembly 175 swings in a similar fashion and the blade portion 205 thereof actuates the corresponding switch to effect operation of the motor 191 to turn the shaft 118 until such time as the vane assemblies 140 are again optimumly angularly displaced relative to the direction of the wind in order to drive the rotor assembly 30 in a counterclockwise direction.

If it is desired, the end of the pull member 179 remote from the latch 177 may be pulled in order to allow the switch actuating blade structure 175 to be swung independent of angular displacement of the shaft 171. By variously swinging the switch actuator blade structure 175 may be operated in order to swing the vane assemblies 140 toward positions in which they will be ineffective to drive the rotor assembly 30 in response to wind incident thereon. Also, the motors 44 may be remotely operative through the utilization of electrical circuitry including a rotary connection at the axis of rotation of the rotor assembly 30.

If it is desired, structure other than sprocket wheels and endless chains may be used to operably connect coacting rotary and oscillatory components of the power generator 10. Such other structure may include bevel gears and shafts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A rotary power generator for disposition in a fluid flow path and to be driven thereby, said generator including a base, a rotor journaled from said base for rotation about a first axis for disposition transverse to said path, said rotor including a plurality of mounting portions spaced radially outwardly from and circumferentially about said axis and including a plurality of vane assemblies rotatably mounted, therefrom for angular displacement about axes generally paralleling said axis, vane assembly displacement control means operatively connected between said base and said vane assemblies for angularly displacing said vane assemblies relative to said mounting portions 180 degrees each 360 degrees of angular displacement of said rotor and in directions opposite to the direction of angular displacement of said rotor, upon rotation thereof, said vane assemblies being variously optimumly angularly positioned relative to said mounting portions and each other to effect substantially maximum thrust therefrom on said rotor as a result of fluid flow thereagainst in one radial direction, said vane assembly displacement control means including angularly displaceable fluid flow sensing means operative to sense angular changes in the radial direction of fluid flow toward said axis to accordingly simultaneously variously angularly position said vane assemblies about their axes of rotation relative to said mounting portions, whereby said vane assemblies are maintained in said optimum position, said control means further including angularly displaceable operator means drivingly connected to said vane assemblies for angularly displacing the vane assemblies in response to angular displacement of said operator, reversible motor means drivingly connected to said operator means selectively reversely angularly displacing said operator means, first and second support structures angularly displaceable with said operator and fluid flow sensing means, respectively, and motor operation controlling switch means and switch actuating means carried by said structures and operatively associated with each other and said motor means for driving said operator means to an angular position corresponding, at least generally, to an angular positional change of said fluid flow sensing means as a result of a change in said radial direction, one of said support structures being angularly displaceable relative to the corresponding angularly displaceable means, and key means operative to releasably key said one support structure in predetermined angular position relative to the corresponding angularly displaceable means.

2. The combination of claim 1 wherein said key means includes manually operable means actuatable from outwardly of the orbital path of said vane assemblies and to selectively angularly displace said one structure relative to the corresponding angularly displaceable means, wherein the angular positions of said vane assemblies relative to said radial direction may be changed to render said fluid flow reduced in effectiveness to drive said rotor about said axis.

3. The combination of claim 1 wherein said axis and said axes comprises upstanding axes and the axes of angular displacement of said fluid flow sensing means, operator means, and first and second support structures coincide with the axis of rotation of said rotor.

4. The combination of claim 1 wherein each of said vane assemblies includes at least one vane member angularly displaceable about an axis disposed at generally right angles relative to the axis of angular displacement of the corresponding vane assembly relative to said rotor between an operative position generally paralleling the axis of rotation of said rotor and a feathered position disposed at substantially right angles relative to the axis of angular displacement of the corresponding vane assembly relative to said rotor.

5. The combination of claim 1 wherein each of said mounting portions includes a single vane assembly rotatably mounted therefrom.

* * * * *